United States Patent
Hogan et al.

(10) Patent No.: US 9,489,365 B2
(45) Date of Patent: Nov. 8, 2016

(54) USER INTERFACE FOR VISUALIZING RESIZING OF TABLE ELEMENTS

(71) Applicant: APPLE INC., Cupertino, CA (US)

(72) Inventors: Edward P. Hogan, Pittsburgh, PA (US); Matthew R. Lehrian, Pittsburgh, PA (US); Zachariah N. Paine, Pittsburgh, PA (US)

(73) Assignee: Apple Inc., Cupertino, CA (US)

( * ) Notice: Subject to any disclaimer, the term of this patent is extended or adjusted under 35 U.S.C. 154(b) by 593 days.

(21) Appl. No.: 13/705,767

(22) Filed: Dec. 5, 2012

(65) Prior Publication Data

US 2014/0157101 A1 Jun. 5, 2014

(51) Int. Cl.
*G06F 17/00* (2006.01)
*G06F 17/24* (2006.01)
*G06F 3/0481* (2013.01)

(52) U.S. Cl.
CPC ........... *G06F 17/245* (2013.01); *G06F 3/0481* (2013.01)

(58) Field of Classification Search
CPC .................................................. G06F 17/246
USPC ................................ 715/227, 200, 212, 217
See application file for complete search history.

(56) References Cited

U.S. PATENT DOCUMENTS

| 5,768,606 | A | 6/1998 | Sharp |
| 7,725,815 | B2* | 5/2010 | Peters ........................... 715/227 |
| 7,930,323 | B2 | 4/2011 | Brookler et al. |
| 7,962,522 | B2* | 6/2011 | Norris, III .................... 707/792 |
| 8,667,405 | B2* | 3/2014 | Roytman ....................... 715/762 |
| 2001/0040585 | A1 | 11/2001 | Hartford et al. |
| 2010/0299587 | A1* | 11/2010 | Swett ............................ 715/227 |

OTHER PUBLICATIONS

Launch Excel, "How to resize multiple columns in Excel", Sep. 24, 2011, Launch Excel, pp. 1-3 (pdf).*
Sun Microsystems, Inc.; "Java Look and Feel Design Guidelines," 1999, http://java.sun.com/products/jlf/ed1/dg/higp.htm.

* cited by examiner

*Primary Examiner* — Manglesh M Patel
(74) *Attorney, Agent, or Firm* — Fletcher Yoder PC

(57) ABSTRACT

The present disclosure relates to the resizing of tables elements, such as rows or columns of a table. In one embodiment, a user selects two or more rows or columns to be resized and performs a column or row manipulation corresponding to the desired resize event, such as be interacting with an edge of one of the selected rows or columns. In an implementation, the user may toggle between the use of different resizing algorithms to see the effects of the different resizing algorithms.

19 Claims, 14 Drawing Sheets

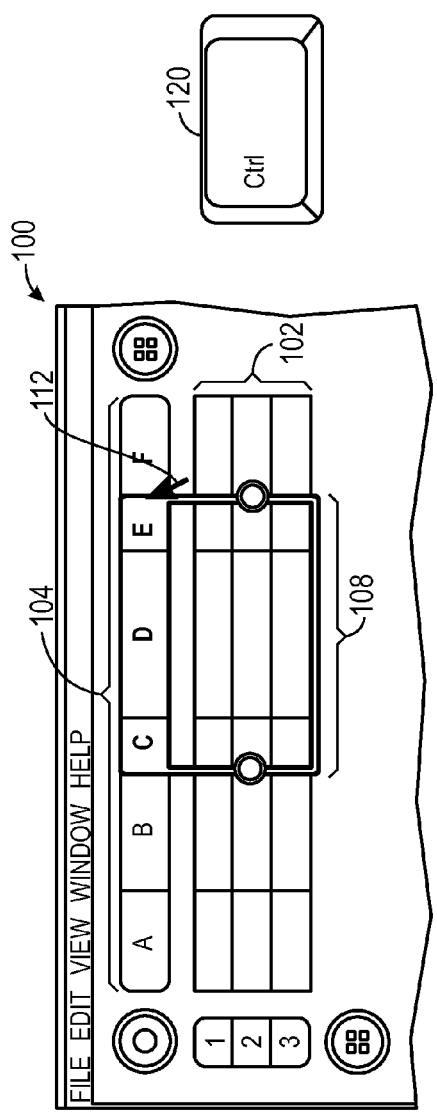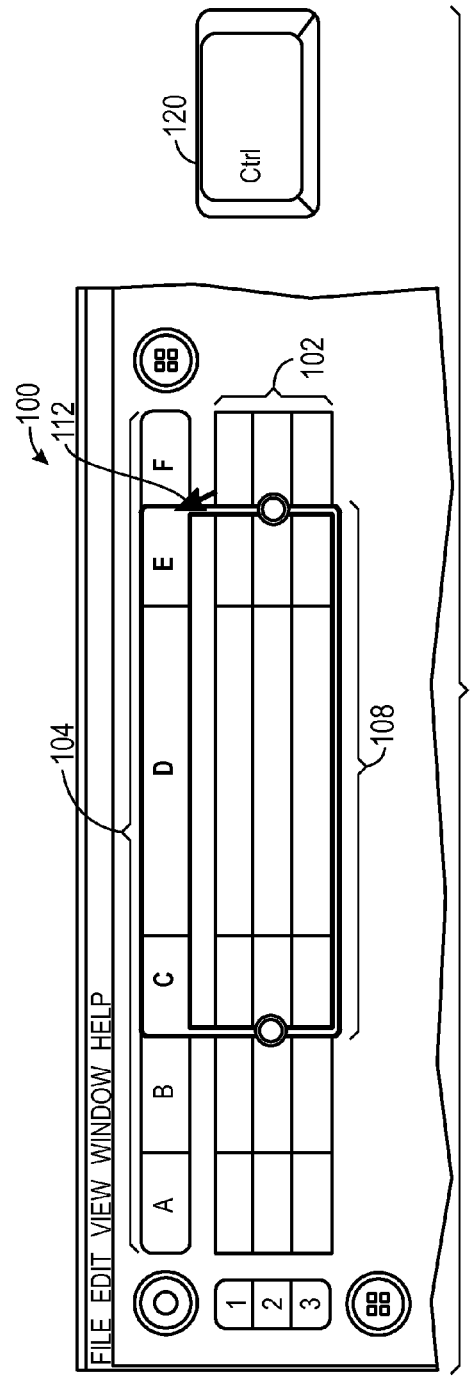

USER INTERFACE FOR VISUALIZING RESIZING OF TABLE ELEMENTS

BACKGROUND

The present disclosure relates generally to the manipulation of tables within a computer-implemented application.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Various applications, such as applications found in work productivity suites, may be used to generate presentations, reports, studies, or other documents. Examples of such applications may include word processing applications, spreadsheet applications, database front-end or management applications, and applications for generating and playing presentations, such as slideshow presentations. Part of the functionality provided by such applications may include allowing a user to generate or manipulate tables in which data is entered or displayed.

Such tables may consist of a number of table elements in the form of columns and rows of cells. When interacting with a table, a user may want to resize multiple rows or columns at one time. In such contexts, there are various types of resize operations that can be performed. For example, one type of resize operation may result in each selected row or column being increased or decreased by some percentage or scaling factor, thus maintaining the initial size relationships between the selected rows or columns. Alternatively, each of the selected columns or rows may be resized to be the same size. In practice, it may be difficult to allow a user to visualize different types of resize operation, which may be desirable to allow a user to see and evaluate the consequences of selecting a particular resize operation.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

As discussed herein, aspects of the present disclosure allow a user to perform a resize operation on rows or columns of a table. In certain embodiments, the user may alternate (e.g., toggle) between views of different types of resize operations to allow the user to visualize the outcome of the resize operation and make adjustments if needed. Further, certain aspects of the present approach maintain continuity between an on-screen element being manipulated by a touch on a screen or by manipulation of a mouse cursor. In this manner, a resize operation (or the visualization of the resize operation) does not result in the element that is being manipulated being moved out from under the user's finger or cursor as a result of the resize operation or its visualization.

BRIEF DESCRIPTION OF THE DRAWINGS

Various aspects of this disclosure may be better understood upon reading the following detailed description and upon reference to the drawings in which:

FIGS. 8A-8E depict a table in which a user toggles between viewing the outcome of a percentage-type resize and a uniform-type resize on a set of selected columns, in accordance with aspects of the present disclosure;

DETAILED DESCRIPTION OF SPECIFIC EMBODIMENTS

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

As discussed herein, an approach is provided for allowing a user to visualize different types of resize operations that can be performed on elements (e.g., rows or columns) of a table. For example, in previous approaches to allowing a user to resize multiple rows or columns of a table, the user might "drag" an edge of a column or row using a finger (in a touch-based implementation) or a mouse pointer. Depending on the number of columns or rows being resized and/or the extent of the resize operation, attempts to provide a visualization of the resize operation could lead to a disorienting user experience (e.g., "mouse warp") where the underlying element (e.g., column or row edge) being moved might be moved out from under the user's finger or mouse pointer. The present approach addresses such disorienting user experiences and allows a user to choose between different types of resize operations and to visualize the outcome of such operations.

Figure 1:
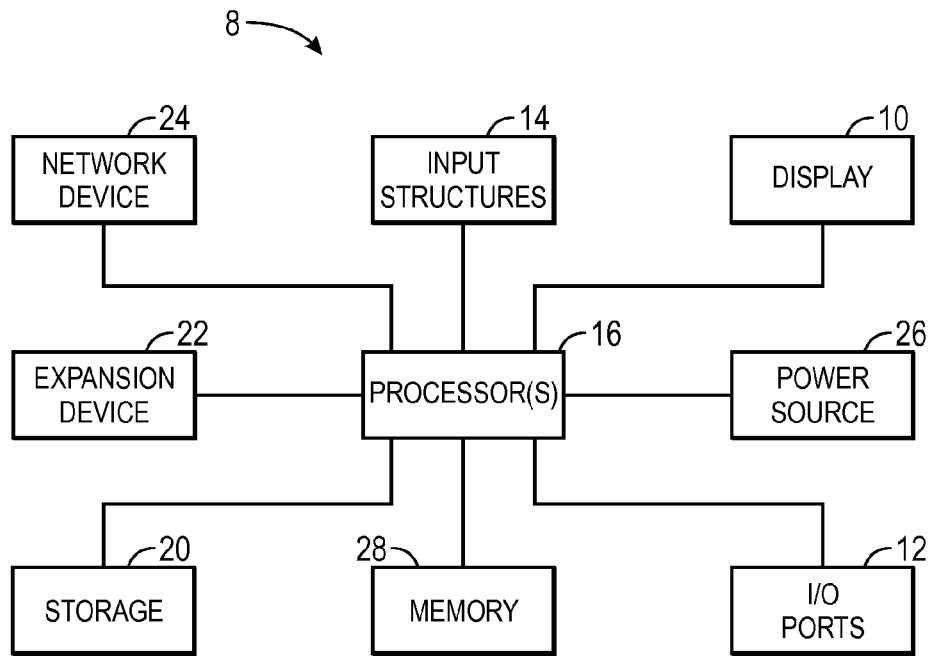
FIG. 1 is a block diagram of components of an example of an electronic device, in accordance with aspects of the present disclosure.
Figure 3:
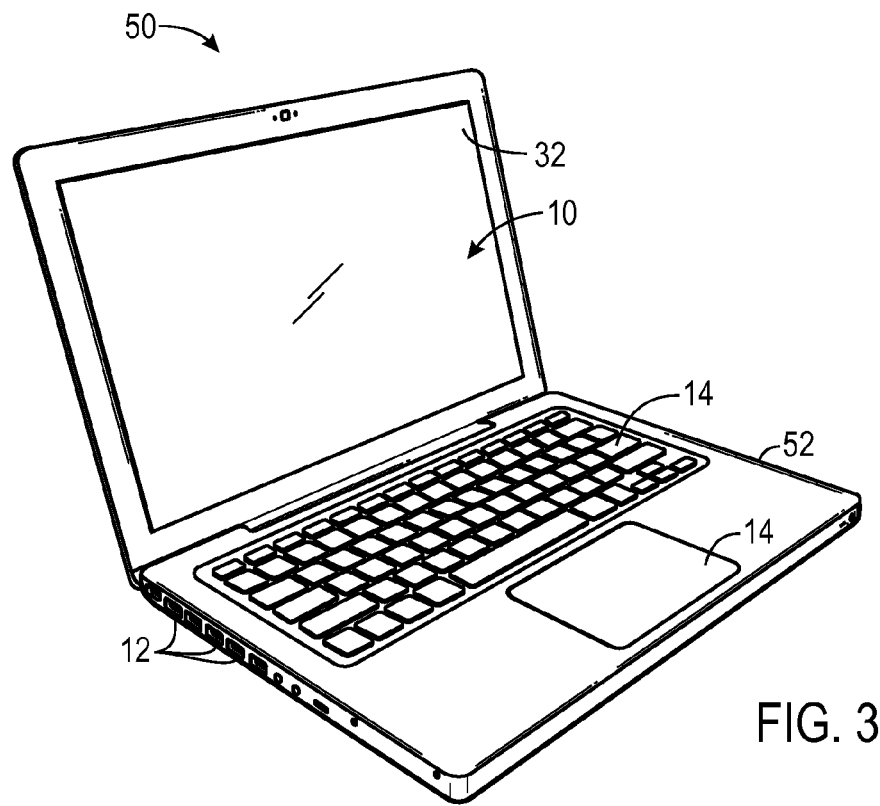
FIG. 3 is a perspective view of an example of a laptop electronic device, in accordance with aspects of the present disclosure.
Figure 2:
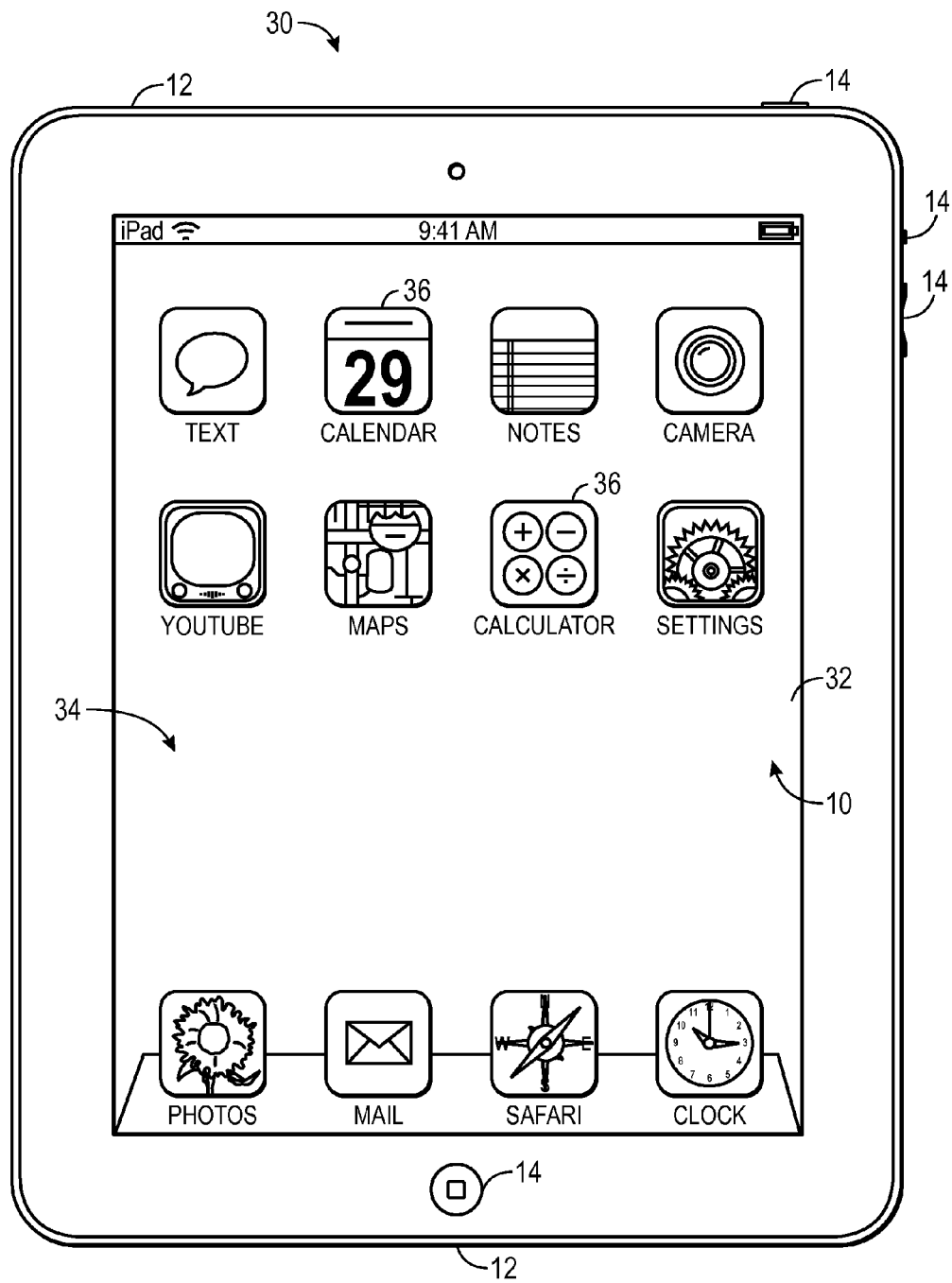
FIG. 2 is a perspective view of an example of a handheld electronic device, in accordance with aspects of the present disclosure.

With the foregoing in mind, a general description is provided below of suitable electronic devices that may be used to implement the display of a table in an application and to allow resizing operations to be performed on the table as discussed herein. In particular, FIG. 1 is a block diagram depicting various components that may be present in an electronic device suitable for executing an application that may allow display and manipulation of a table, as described herein. FIGS. 2 and 3 respectively illustrate perspective and front views of suitable electronic devices, which may be, as illustrated, a handheld electronic device (e.g., a tablet computer) or other mobile computing device (e.g., a laptop computer).

An example of an electronic device suitable for the techniques described herein may include various internal and/or external components. For example, FIG. 1 is a block diagram illustrating the components that may be present in such an electronic device 8, allowing the electronic device 8 to function. One of ordinary skill in the art will appreciate that the various functional blocks shown in FIG. 1 may comprise hardware elements (including circuitry), software elements (including computer code stored on a computer-readable medium), or a combination of both hardware and software elements. It should further be noted that FIG. 1 is merely one example of a particular implementation and is merely intended to illustrate the types of components that may be present in a device 8. For example, in the presently illustrated embodiment, these components may include a display 10, I/O ports 12, input structures 14, one or more processors 16, a memory device 18, a non-volatile storage 20, expansion card(s) 22, a networking device 24, and a power source 26.

With regard to each of these components, the display 10 may be used to display various images generated by the device 8. The display 10 may be an LCD, OLED-type display, or other suitable display device. Additionally, in certain embodiments of the electronic device 8, the display 10 may be provided in conjunction with a touch-sensitive element, such as a touchscreen, that may be used as part of the control interface for the device 8 and, further, may be used in conjunction with the presently disclosed approach to resize rows or columns of a table displayed on the touchscreen.

The I/O ports 12 may include ports configured to connect to a variety of external devices, such as a power source, headset or headphones, or other electronic devices (such as handheld devices and/or computers, printers, projectors, external displays, modems, docking stations, and so forth). The I/O ports 12 may support any interface type, such as a universal serial bus (USB) port, a video port, a serial connection port, an IEEE-1394 or Firewire™ port, a Thunderbolt™ port, an Ethernet or modem port, and/or an AC/DC power connection port.

The input structures 14 may include the various devices, circuitry, and pathways by which user input or feedback is provided to the processor 16. Such input structures 14 may be configured to control a function of the device 8, applications running on the device 8, and/or any interfaces or devices connected to or used by the electronic device 8. For example, the input structures 14 may allow a user to navigate a displayed user interface or application interface. Examples of the input structures 14 may include buttons, sliders, switches, control pads, keys, knobs, scroll wheels, keyboards, mice, touchpads, internal accelerometers, and so forth.

In certain embodiments, an input structure 14 and display 10 may be provided together, such as in the case of a touchscreen, where a touch sensitive mechanism is provided in conjunction with the display 10. In such embodiments, the user may select or interact with displayed interface elements (such as column or row elements of a displayed table) via the touch sensitive mechanism. In this way, the displayed interface may provide interactive functionality, allowing a user to navigate the displayed interface by touching the display 10.

User interaction with the input structures 14, such as to interact with a user or application interface displayed on the display 10, may generate electrical signals indicative of the user input. These input signals may be routed via suitable pathways, such as an input hub or bus, to the processor(s) 16 for further processing.

The processor(s) 16 may provide the processing capability to execute the operating system, programs, user and application interfaces (e.g., a word processor, spreadsheet, database, or presentation application user interface), and any other functions of the electronic device 8. The processor(s) 16 may include one or more microprocessors, such as one or more "general-purpose" microprocessors, one or more special-purpose microprocessors and/or ASICS, or some combination of such processing components. For example, the processor 16 may include one or more central processing units (CPUs), physics processors, graphics processors, video processors, audio processors and/or related chip sets.

The instructions or data to be processed by the processor(s) 16 may be stored in a computer-readable medium, such as a memory 18. Such a memory 18 may be provided as a volatile memory, such as random access memory (RAM), and/or as a non-volatile memory, such as read-only memory (ROM). The memory 18 may store a variety of information and may be used for various purposes. For example, the memory 18 may store firmware for the electronic device 8 (such as a basic input/output instruction or operating system instructions), various programs, applications, or routines executed on the electronic device 8, user interface functions, processor functions, and so forth. In addition, the memory 18 may be used for buffering or caching during operation of the electronic device 8.

The components may further include other forms of computer-readable media, such as a non-volatile storage 20, for persistent storage of data and/or instructions. The non-volatile storage 20 may include flash memory, a hard drive, or any other optical, magnetic, and/or solid-state storage media. The non-volatile storage 20 may be used to store firmware, data files, software, hardware configuration information, and any other suitable data.

The embodiment illustrated in FIG. 1 may also include one or more card or expansion slots. The card slots may be configured to receive an expansion card 22 that may be used to add functionality, such as additional memory, I/O functionality, or networking capability, to the electronic device 8. Such an expansion card 22 may connect to the device through any type of suitable connector, and may be accessed internally or external to the housing of the electronic device 8. For example, in one embodiment, the expansion card 22 may be a flash memory card, such as a SecureDigital (SD) card, mini- or microSD, CompactFlash card, Multimedia card (MMC), or the like.

The components depicted in FIG. 1 also include a network device 24, such as a network controller or a network interface card (NIC). In one embodiment, the network device 24 may be a wireless NIC providing wireless connectivity over any 802.11 standard; any 2G, 3G, or 4G cellular data standard; or any other suitable wireless networking standard. The network device 24 may allow the electronic device 8 to communicate over a network, such as a Local Area Network (LAN), Wide Area Network (WAN), or the Internet. Further, the electronic device 8 may connect to and send or receive data with any device on the network, such as portable electronic devices, personal computers, printers, and so forth. Alternatively, in some embodiments, the electronic device 8 may not include a network device 24. In such an embodiment, a NIC may be added as an expansion card 22 to provide similar networking capability as described above.

Further, the components may also include a power source 26. In one embodiment, the power source 26 may be one or more batteries, such as a lithium-ion polymer battery or other type of suitable battery. The battery may be user-removable or may be secured within the housing of the electronic device 8 and may be rechargeable. Additionally, the power source 26 may include AC power, such as provided by an electrical outlet, and the electronic device 8 may be connected to the power source 26 via a power adapter and suitable connector port. This power adapter may also be used to recharge one or more batteries, if present.

With the foregoing in mind, FIG. 2 illustrates an electronic device 8 in the form of a handheld device 30, here a tablet computer. By way of example, the handheld device 30 may be a model of an IPad®, IPod®, or IPhone® available from Apple Inc. of Cupertino, Calif. It should be noted that while the depicted handheld device 30 is provided in the context of a tablet computer, other types of handheld devices (such as media players for playing music and/or video, personal data organizers, handheld game platforms, electronic books, handheld GPS navigation units, and/or combinations of such devices) may also be suitably provided as the electronic device 8. Further, a suitable handheld device 30 may incorporate the functionality of one or more types of devices, such as a media player, a cellular phone, a gaming platform, an electronic book, a personal data organizer, and so forth.

For example, in the depicted embodiment, the handheld device 30 is in the form of a tablet computer that may provide various functionalities (such as the ability to take pictures, record audio and/or video, listen to music, play games, map travel routes, and so forth) in addition to running applications, such as productivity software, capable of displaying and manipulating tables. As discussed with respect to the general electronic device of FIG. 1, the handheld device 30 may allow a user to connect to and communicate through the Internet or through other networks, such as local or wide area networks. The handheld electronic device 30, may also communicate with other devices using short-range connections, such as Bluetooth and near field communication.

In the depicted embodiment, the handheld device 30 includes an enclosure or body that protects the interior components from physical damage and shields them from electromagnetic interference. The enclosure may be formed from any suitable material such as plastic, metal, or a composite material and may allow certain frequencies of electromagnetic radiation to pass through to wireless communication circuitry within the handheld device 30 to facilitate wireless communication.

In the depicted embodiment, the enclosure includes user input structures 14 through which a user may interface with the device. Each user input structure 14 may be configured to help control a device function when actuated. For example, in a tablet computer implementation, one or more of the input structures 14 may be configured to invoke a "home" screen or menu to be displayed, to toggle between a sleep and a wake mode, adjust the volume of audible feedback, and so forth.

In the depicted embodiment, the handheld device 30 includes a display 10 in the form of an LCD 32. The LCD 32 may be used to display a graphical user interface (GUI) 34 that allows a user to interact with the handheld device 30. The GUI 34 may include various layers, windows, screens, templates, or other graphical elements that may be displayed in all, or a portion, of the LCD 32. Generally, the GUI 34 may include graphical elements that represent applications and functions of the electronic device. The graphical elements may include icons 36 and other images representing buttons, sliders, menu bars, and the like. The icons 36 may correspond to various applications of the electronic device that may open upon selection of a respective icon 36. Furthermore, selection of an icon 36 may lead to a hierarchical navigation process, such that selection of an icon 36 leads to a screen that includes one or more additional icons or other GUI elements. The icons 36 may be selected via a touchscreen included in the display 10, or may be selected by a user input structure 14, such as a mouse, wheel, or button.

The handheld electronic device 30 also may include various input and output (I/O) ports 12 that allow connection of the handheld device 30 to external devices. For example, one I/O port 12 may be a port that allows the transmission and reception of data or commands between the handheld electronic device 30 and another electronic device, such as a computer. Such an I/O port 12 may be a proprietary port from Apple Inc. or may be an open standard I/O port.

In addition to handheld devices 30, such as the depicted tablet computer of FIG. 2, an electronic device 8 may also take the form of a computer or other type of electronic device. Such computers may include computers that are generally portable (such as laptop or notebook computers) as well as computers that are generally used in one place (such as conventional desktop computers, workstations and/or servers). In certain embodiments, the electronic device 8 in the form of a computer may be a model of a MacBook®, MacBook® Pro, MacBook Air®, IMac®, Mac® mini, or Mac Pro® available from Apple Inc. By way of example, an electronic device 8 in the form of a laptop computer 50 is illustrated in FIG. 3, in accordance with one embodiment of the present disclosure. The depicted computer 50 includes a housing 52, a display 10 (such as the depicted LCD 32), input structures 14, and input/output ports 12.

In one embodiment, the input structures 14 (such as a keyboard and/or touchpad) may be used to interact with the computer 50, such as to start, control, or operate a GUI or applications running on the computer 50. For example, a keyboard, mouse, and/or touchpad may allow a user to navigate a user interface or application interface displayed on the LCD 32.

As depicted, the electronic device 8 in the form of computer 50 may also include various input and output ports 12 to allow connection of additional devices. For example, the computer 50 may include an I/O port 12, such as a USB port, Thunderbolt® port, or other port, suitable for connecting to another electronic device, a projector, a supplemental display, and so forth. In addition, the computer 50 may include network connectivity, memory, and storage capabilities, as described with respect to FIG. 1. As a result, the computer 50 may store and execute a GUI and other applications (e.g., productivity and/or presentation applications having a user interface).

With the foregoing discussion in mind, an electronic device 8, such as either a handheld electronic device 30 or computer 50, may be used to store and run an application that allows a user to generate and/or manipulate tables in which data is stored or presented. Such tables typically include multiple rows and columns that define individual cells where data is entered. The present disclosure relates to approaches and algorithms whereby a user can resize or otherwise modify columns or rows of a table and which provide live or real-time feedback of such resizing actions to the user while maintaining continuity of the users contact point during such visualizations.

Such resize operations involving multiple columns or rows may generally fall in to two categories: those which change the size (i.e., width of a column or height of a row) of the selected rows or columns by some percentage or scaling factor (i.e., a percentage-type resize that maintains existing difference in size) and those which change the selected rows or columns to have the same size (i.e., a uniform-type resize that makes the selected columns the same width or the selected rows the same height).

Figure 4:
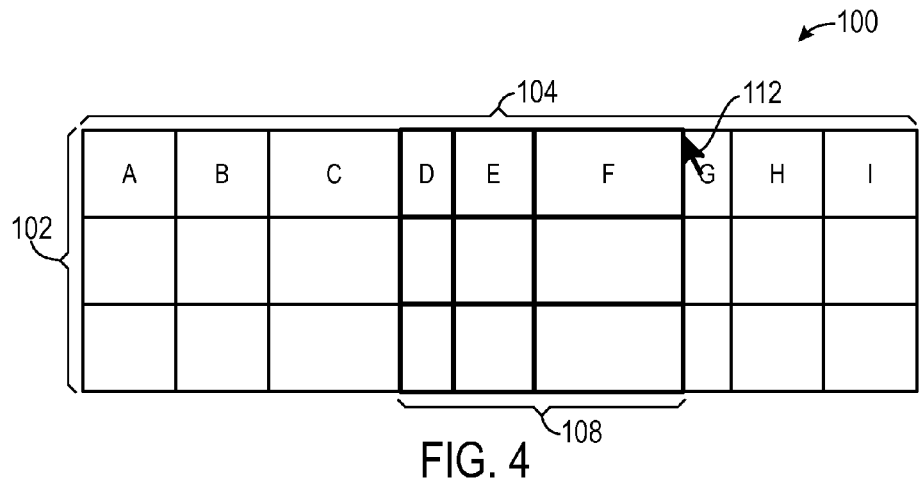
FIG. 4 depicts a table in which a subset of columns are selected for resizing, in accordance with aspects of the present disclosure.
Figure 5:
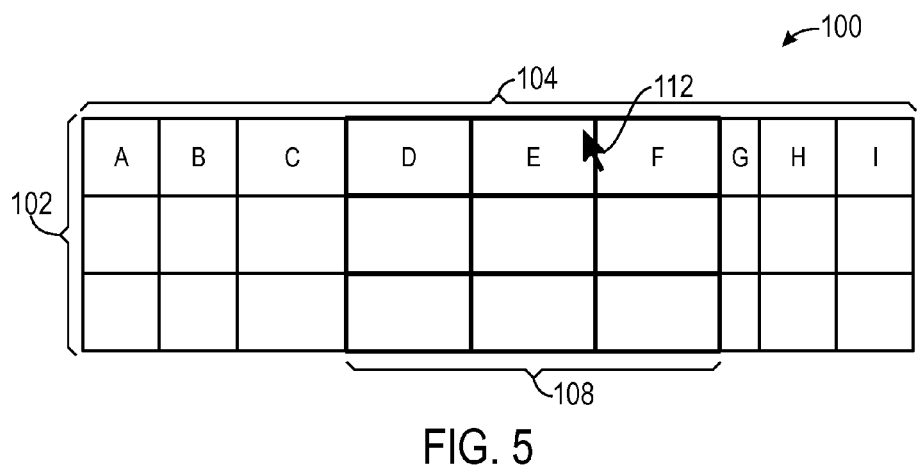
FIG. 5 depicts the table of FIG. 4 after the selected columns are resized to be uniform in size, in accordance with aspects of the present disclosure.

Allowing a user to visualize the result or effect of such changes may be particularly difficult, particularly when large numbers of rows or columns are selected. For example, turning to FIGS. 4 and 5, a table 100 is depicted having multiple rows 102 and columns 104 and in which three columns (columns "D", "E", and "F") are selected (i.e., selected columns 108). In the depicted example, a mouse point 112 is used to drag an edge of a column (i.e., column "F" in FIG. 4) so as to resize the selected columns 108, here to increase the width of the selected columns 108. As depicted in FIG. 5, the resize operation begun in FIG. 4 is a uniform-type resize operation in which all of the selected columns 108 are set to the same size, here the width of column "F". In particular, FIG. 5 depicts a visualization of the proposed resize operation so as to provide visual feedback of the result of the resize operation to the user. Due to the number of columns selected, and their respective changes in width, the contact point on screen which was manipulated by the user via mouse pointer 112 (i.e., the right edge of column "F") is moved out from underneath the mouse pointer 112 in the visualization, as depicted in FIG. 5.

As will be appreciated, such an occurrence may be undesirable and/or disorienting from the user's perspective. One approach to address this problem is to only depict the resizing operation as applied to one or a limited number of the selected columns or rows during visualization of the operation, thereby limiting the possible movement of the contact point out from under the users finger (in a touch screen implementation) or mouse pointer 112. However, such an approach fails to provide the user with an accurate representation of how the table 100 will appear upon completion of the proposed resize operation.

With the foregoing in mind, various algorithms are discussed herein for facilitating visualization of a resize operation applied to multiple rows 102 or columns 104 of a table 100. Prior to describing these algorithms in detail, a brief discussion of various resizing algorithms is provided, where the respective resizing algorithms may be suitable for use with the visualization approaches discussed further below. For example, turning to FIGS. 6A-6D, an example of a percentage or proportional-type resizing algorithm is depicted. Such algorithms may act by applying a scaling factor to each element in the selected group (e.g., selected columns 108). When an element (e.g., a column 104 or row 102) reaches its minimum or maximum size, the resize difference is spread among the remaining selected elements that have not reached their minimum or maximum size. Such an algorithm, within the constraints imposed by minimum and maximum values for the width of a column or height of a row, generally acts to maintain the size relationships or hierarchy present in the selected elements (e.g., the largest column prior to the resize operation will be the largest column after the resize operation).

Figure 6A:
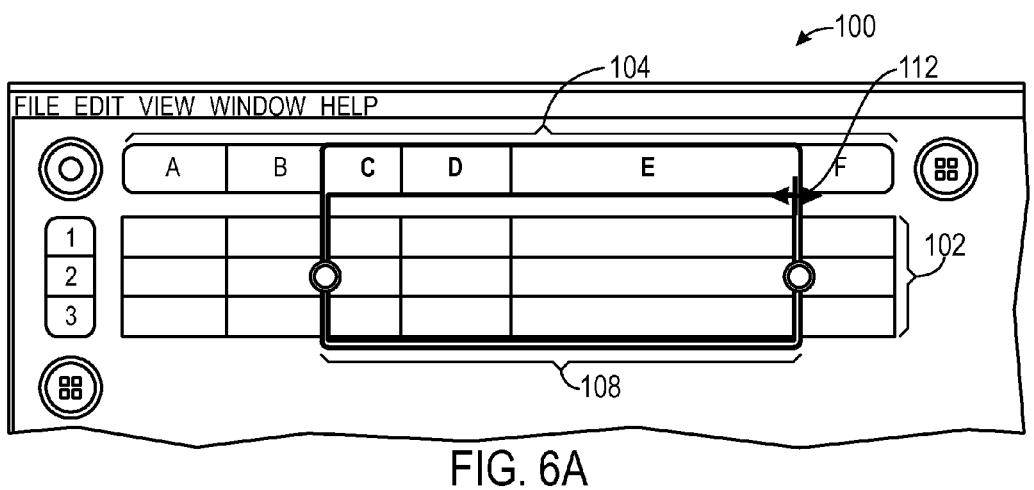
FIGS. 6A-6D depict a table undergoing a percentage-type resize operation, in accordance with aspects of the present disclosure.
Figure 6B:
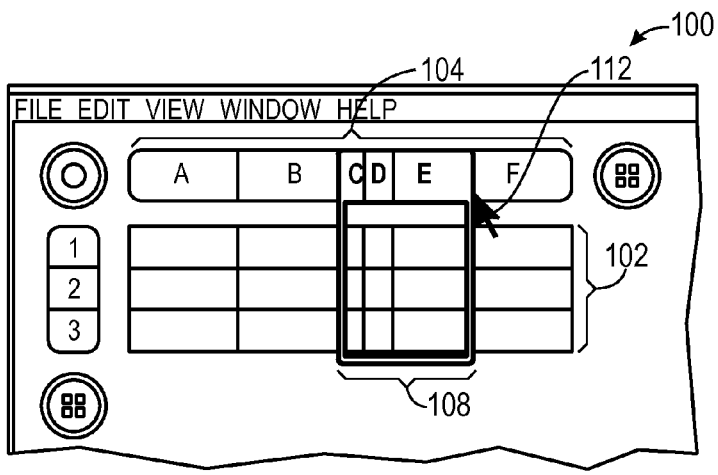

By way of example, and turning to FIGS. 6A-6D, a table 100 is depicted having rows 102, columns 104, and selected columns 108. A user may resize the selected columns 108, such as by dragging an edge of a column to the right or left using a finger (in a touch screen embodiment) or mouse pointer 112. For example, in FIG. 6A, an initial layout of the table 100 is depicted. A mouse pointer 112 (visually altered to indicate edge selection for a column resize event) is depicted at the outside edge of column "E", indicating readiness for the resize event. In FIG. 6B, the user has moved the mouse pointer 112 inward (i.e., to the left), thereby decreasing the width of each of the selected columns 108 by a proportional or scaled amount. Thus, the selected columns 108 maintain their initial width relationship to one another, (i.e., the widest column remains the widest, the narrowest column remains the narrowest). As depicted, the width of the columns that are not selected is unchanged.

Figure 6C:
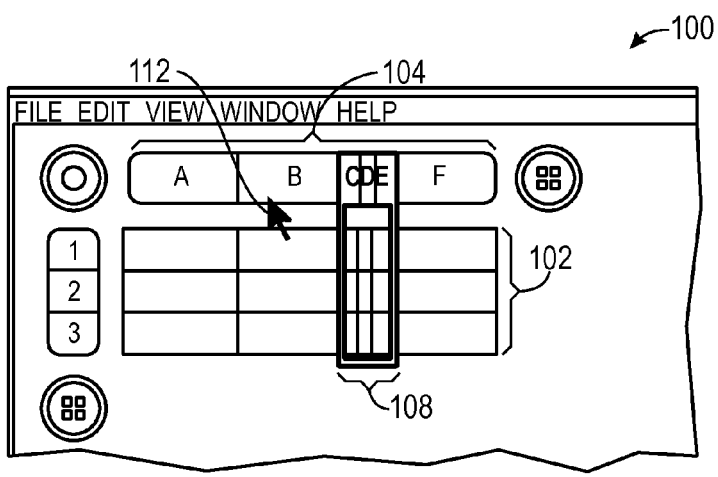
Figure 6D:
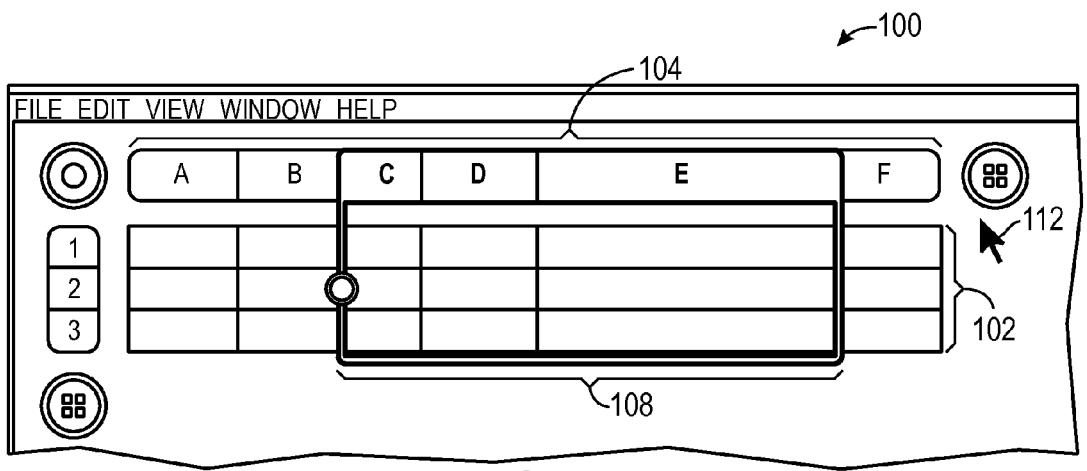

Turning to FIG. 6C, the user has continued to move the mouse pointer 112 inward (and, indeed, has moved the mouse pointer 112 beyond the leftmost edge of the selected columns). In this example, the columns 104, including selected columns 108, have a minimum width, which is depicted in FIG. 6C in response to the user input moving the mouse pointer 112 beyond the area bounded by the selected columns 108. Hence, each of the selected columns 108 are set to the minimum column width in response to this extreme user input. Conversely, turning to FIG. 6D, once the user moves the mouse pointer 112 back outward (here to the right) from the selected columns 108, the selected columns 108 are again proportionately expanded or widened based on a scaling factor and their initial widths. For example, in FIG. 6D, each of the selected columns 108 is wider than its initial value by some scaling factor determined based upon the position and/or motion of the mouse pointer 112.

Figure 7A:
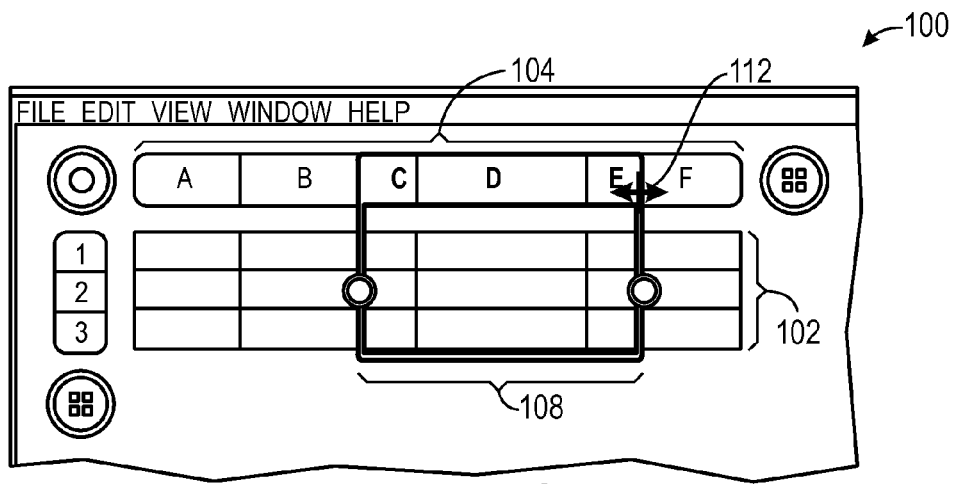
FIGS. 7A-7C depict a table undergoing a uniform-type resize operation, in accordance with aspects of the present disclosure.
Figure 7B:
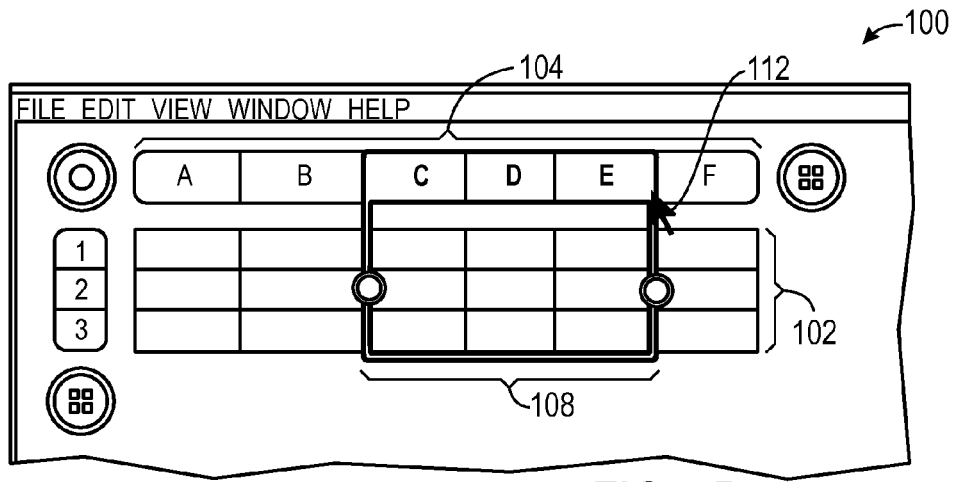
Figure 7C:
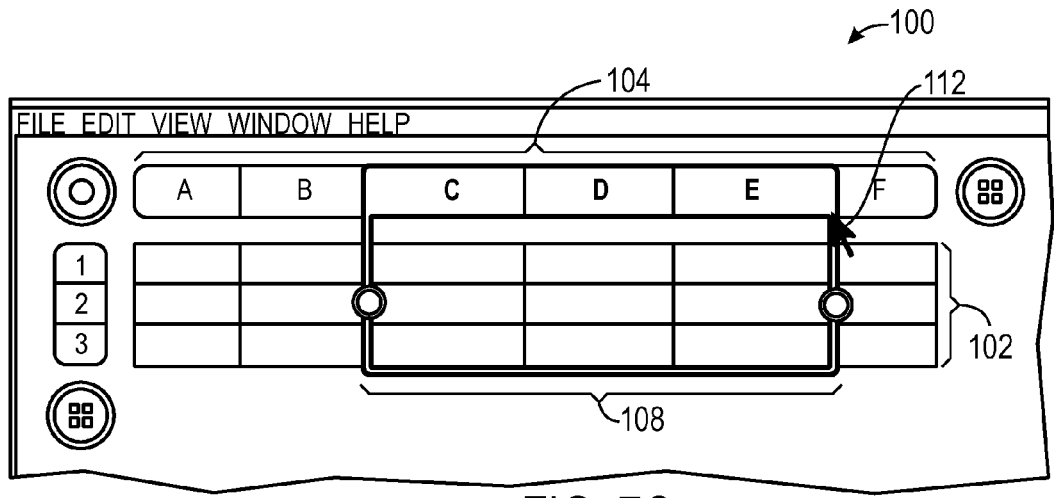

This is in contrast to the uniform-type resize algorithm, an example of which is depicted in FIG. 7A-7C. The depicted example of a uniform-type resize algorithm acts by averaging all of the elements (e.g., columns or rows) in the selected group to be resized (i.e., selected columns 108) and sets the width of all selected elements to this average size. Such a resize algorithm that acts by setting the widths (or heights) of the selected elements to an average value may be characterized as a unify-type algorithm. In the even that an element (e.g., column) reaches its minimum configured or set size, the resize difference may be distributed evenly among the remaining elements to be resized.

By way of example, and turning back to the figures, FIG. 7A depicts a table 100 having rows 102 and columns 104. A set of columns 104 (i.e., selected columns 108) has been selected to undergo a unified resize operation, such as by the user positioning the mouse pointer 112 (or a finger) at an edge of the selected columns 108 to be resized and dragging the selected edge inward or outward to resize the selected columns 108. In the depicted example of FIG. 7A, the mouse pointer 112 is visually altered to indicate edge selection (i.e., the edge of column "E") for a column resize event. As depicted in FIG. 7A, the selected columns 108 are initially of varied widths (i.e., column "D" is wider than columns "C" and "E"). Upon commencement of the uniform-type resize event, however, the columns are resized to be the same size, within the constraints specified for a column in terms of minimum or maximum widths).

For example, turning to FIG. 7B, the user has moved the mouse pointer 112 outward and the selected columns 108 are resized to be the same size and to occupy the widened space allotted for the selected columns 108. In the context of a unified resize, the position of the mouse pointer 112 provides an input to the resize algorithm that is used to determine an average width for each element (e.g., row or column) that will meet the allotted width range specified by the user input. For example, regardless of the initial widths of the columns, if the user moves the mouse pointer 112 so as to allot 3 inches of width for three selected columns 108, that three inches would be divided by the number of selected columns 108 (e.g., three) to determine a width for each selected column 108 (one inch in this example). Turning to FIG. 7C, the example is continued, with the mouse pointer 112 being moved further outward, thus increasing the width allotted for the selected columns 108, resulting in the widths of the selected columns 108 being increased and the selected columns 108 continuing to be assigned the same width based on the total allotted space (i.e., a column minimum or maximum width has not been reached in this example).

A variation on the unified resize algorithm discussed may be a fixed resize algorithm. Unlike the discussed unified resize algorithm, which performs an averaging operation to determine the width of the selected columns 108, a fixed resize algorithm, when implemented, sets all of the selected elements (e.g., selected columns 108) to a fixed or specified size that need not be based upon an averaging of the space or width allotted by the user. Any resize difference (such as due to a minimum or maximum column width or row height) is spread among the remaining selected elements.

With the foregoing various resize algorithms in minds, aspects of the present disclosure relate to providing a user with a visualization of the implementation of such algorithms such that the user can see the effect or outcome of the implementation of a given resize algorithm compared to a different resize algorithm. By way of example, and turning to FIGS. 8A-8E, an implementation of a visualization algorithm is depicted in which two different types of resize algorithms are available to the user and the user can toggle or switch between different respective visualizations corresponding to the different resize algorithms to see the different respective outcomes associated with the respective resize algorithms. In one embodiment, the user can press a modifier key 120 (such as a SHIFT, OPTION, or CONTROL key) to toggle or switch between the respective visualizations for the different resize algorithms. Further, in the depicted embodiments, the mouse pointer 112 (or the user's finger in a touch-based implementation) remains in the same position relative to the table 100 as the user toggles between the different respective visualizations.

For example, turning to FIG. 8A, a table 100 is initially displayed that includes rows 102 and columns 104. In the depicted example the user has selected columns 108 for resizing, with the mouse pointer 112 controlled by the user interacting with the edge of the rightmost column (column "E") of the set of selected columns 108. In this example, an initial resize algorithm, such as a percentage-based algorithm, is employed such that the user's motion of the mouse pointer 112 results in a percentage-based or scaled change in the size of the selected elements (the width of the selected columns 108 in the depicted example).

For example, in FIG. 8B, the user has moved the mouse pointer 112 outward, causing the selected columns 108 to each increase in width by some percentage or scale factor. Because the resize algorithm employed is percentage-based (and no column minimum or maximum widths have been reached), the respective selected columns 108 maintain their respective size relationships with respect to one another. At this point in the example, the modifier key 120 has not been actuated or pressed by the user.

Figure 8C:
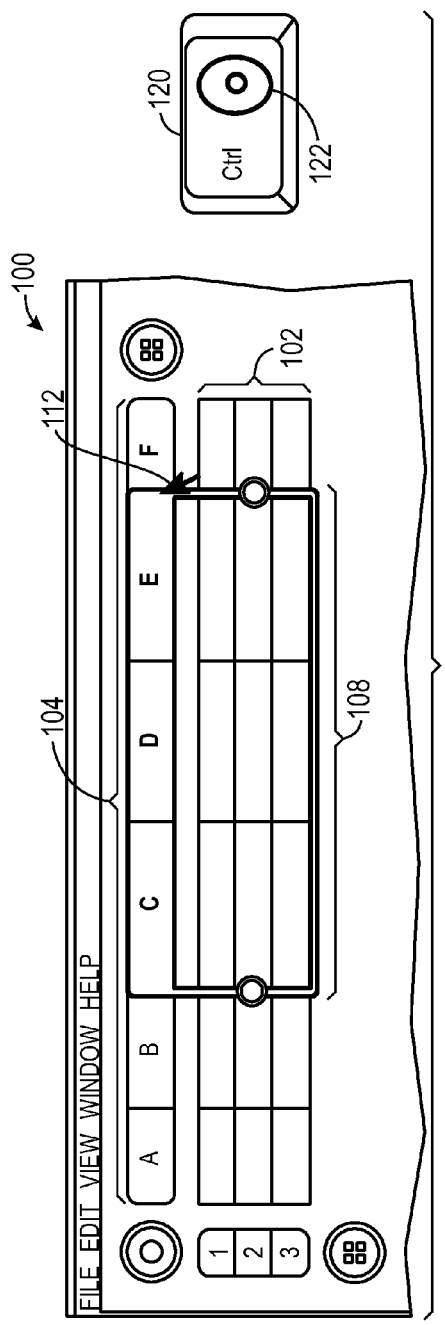
Figure 8D:
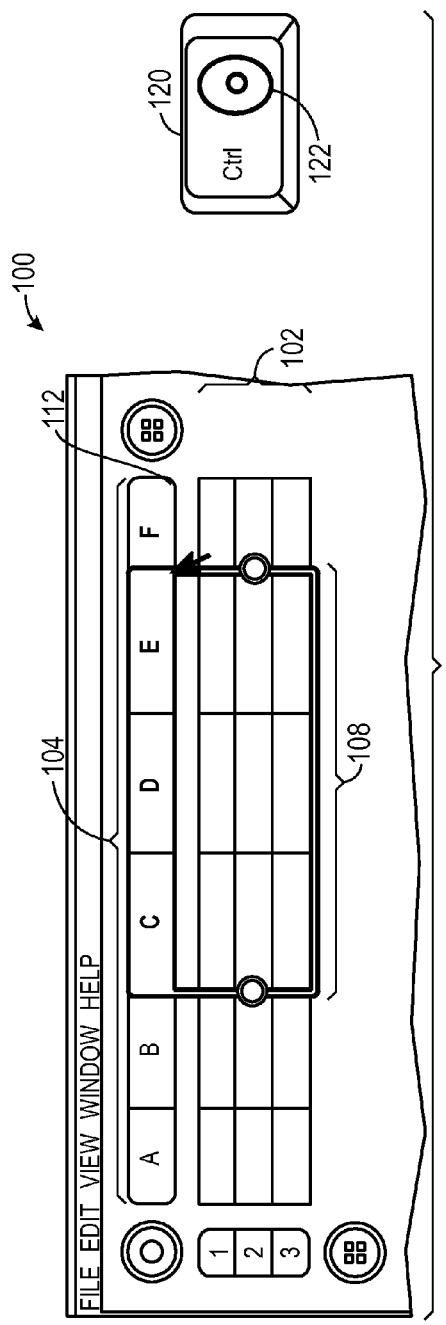
Figure 8E:
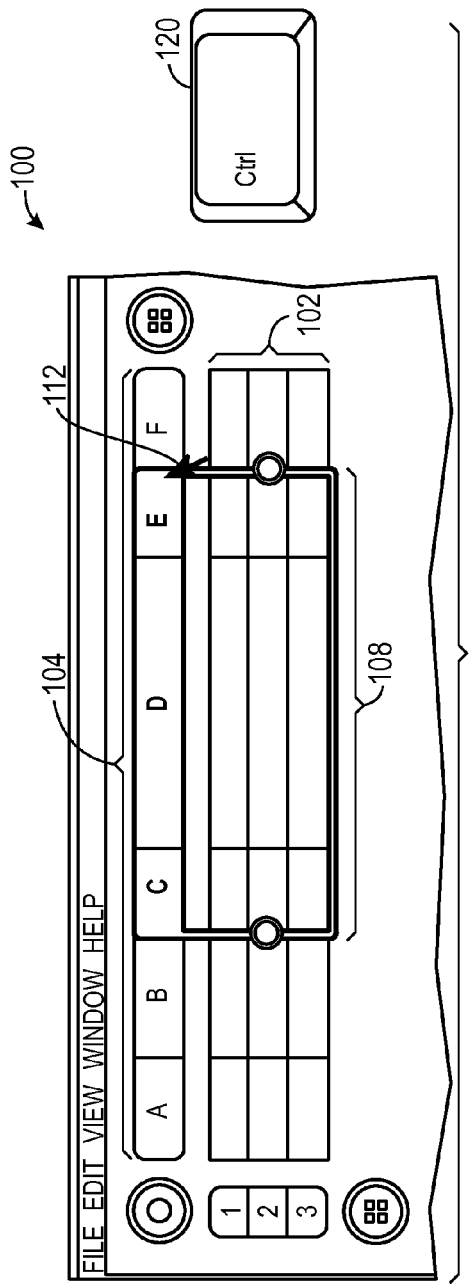

Turning to FIG. 8C, the user actuates or presses the designated modifier key 120, as indicated by touch or contact point 122. In response to activation of the modifier key, the display of table 100 on the electronic device 8 is altered to reflect the outcome of the selected columns 108 undergoing a uniform-type resize operation. As will be noted, the mouse pointer 112 remains positioned at the same point relative to the table 100, i.e., at the outside edge of column "E", during the switch between resize algorithms being visualized.

Because the mouse pointer 112 maintains its position relative to the table 100, and to selected columns 108 in particular, the user may continue resizing the selected columns 108 and visualizing the outcome without distraction or confusion. For example, turning to FIG. 8D, the user has moved the mouse pointer 112 inward, thus decreasing the size of the selected elements (i.e., decreasing the width of the selected columns 108) while still employing a uniform-type resize algorithm (as indicated by the continued contact 122 on modifier key 120). However, turning to FIG. 8E, if the user desires to view the outcome of the resize operation as it would be performed using a percentage-based approach, the user can release the modifier key 120 (as indicated by the absence of contact or touch point 122), causing the electronic device 8 to display the outcome of using such a percentage-based algorithm. As noted above, the mouse pointer 112 (or user's finger in a touch-based implementation) remains in the same location relative to the table 100 (i.e., the outermost edge of column "E") and the selected columns 108 when the visualization is switched between algorithms.

Turning to FIGS. 9A-9E, a similar example is provided in the context of a set of selected columns 108 that are discontinuous. In particular, turning to FIG. 9A, in this example a table 100 is depicted having rows 102 and columns 104. The selected columns 108 for resizing are disjoint in that the range of selected columns 108 (i.e., columns "B", "E", and "F") is not contiguous but is instead separated in part by intervening columns 128 (i.e., columns "C" and "D").

As in the preceding example, the mouse pointer 112 controlled by the user is positioned with respect to the rightmost column (column "F") of the set of selected columns 108. In this example, an initial resize algorithm, such as a percentage-based algorithm, is employed such that the user's motion of the mouse pointer 112 results in a percentage-based or scaled change in the size of the selected elements (the width of the selected columns 108 in the depicted example).

Figure 9A:
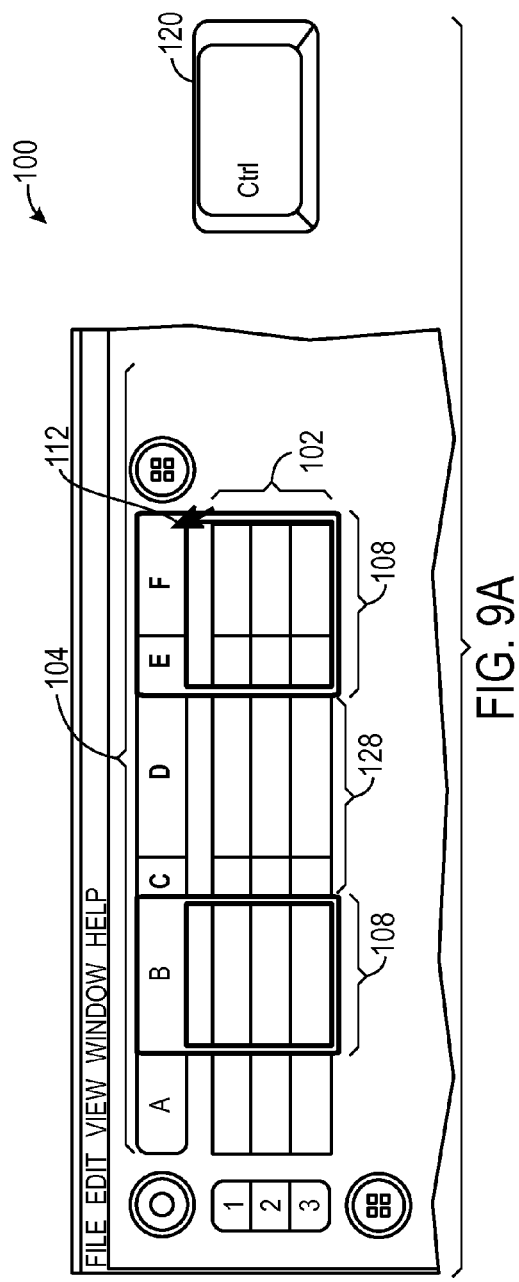
FIGS. 9A-9E depict a table in which a user toggles between viewing the outcome of a percentage-type resize and a uniform-type resize on a discontinuous set of selected columns, in accordance with aspects of the present disclosure.
Figure 9B:
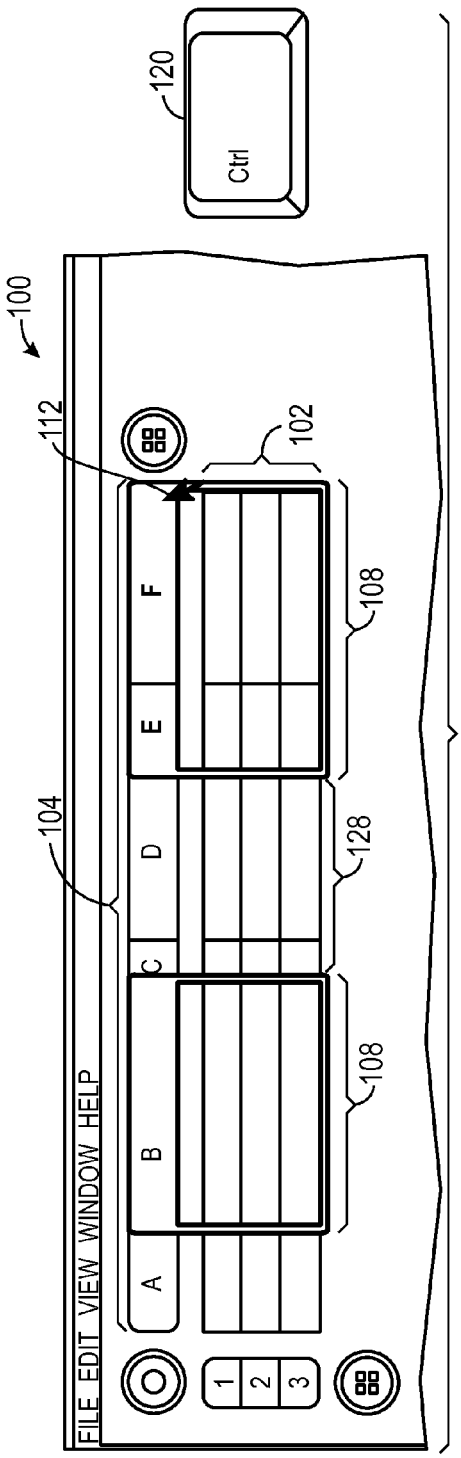

For example, in FIG. 9B, the user has moved the mouse pointer 112 outward, causing each of the selected columns 108 to increase in width by some percentage or scale factor. The intervening columns 128, however are not included in the resize operation and, therefore, are unchanged in size (here column width). Because the resize algorithm employed is percentage-based (and no column minimum or maximum widths have been reached), the respective selected columns 108 maintain their respective size relationships with respect to one another. At this point in the example, the modifier key 120 has not been actuated or pressed by the user.

Figure 9C:
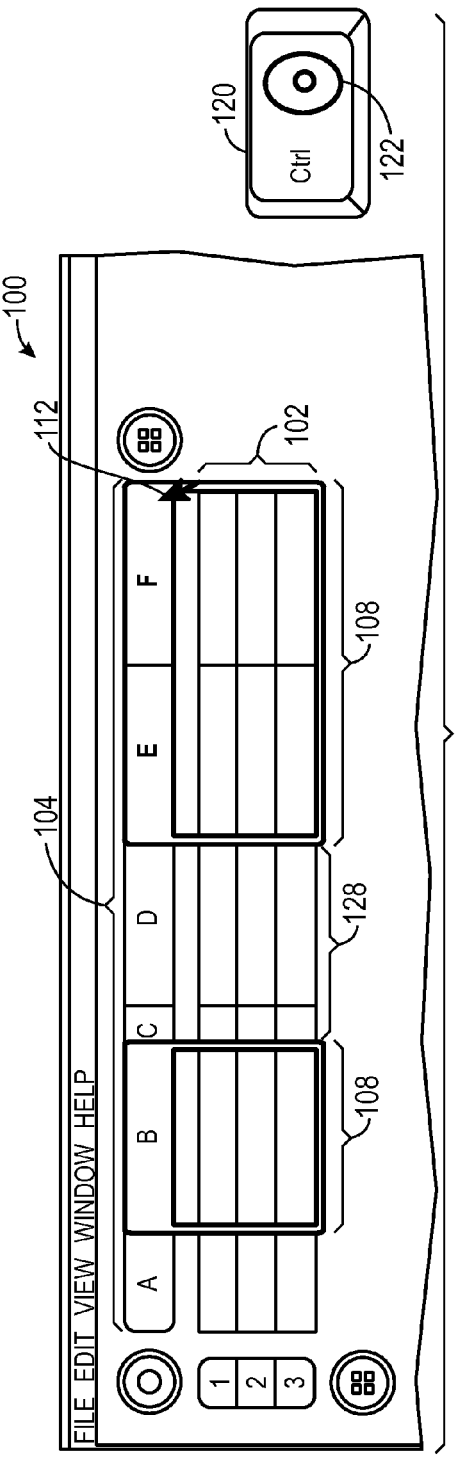
Figure 9D:
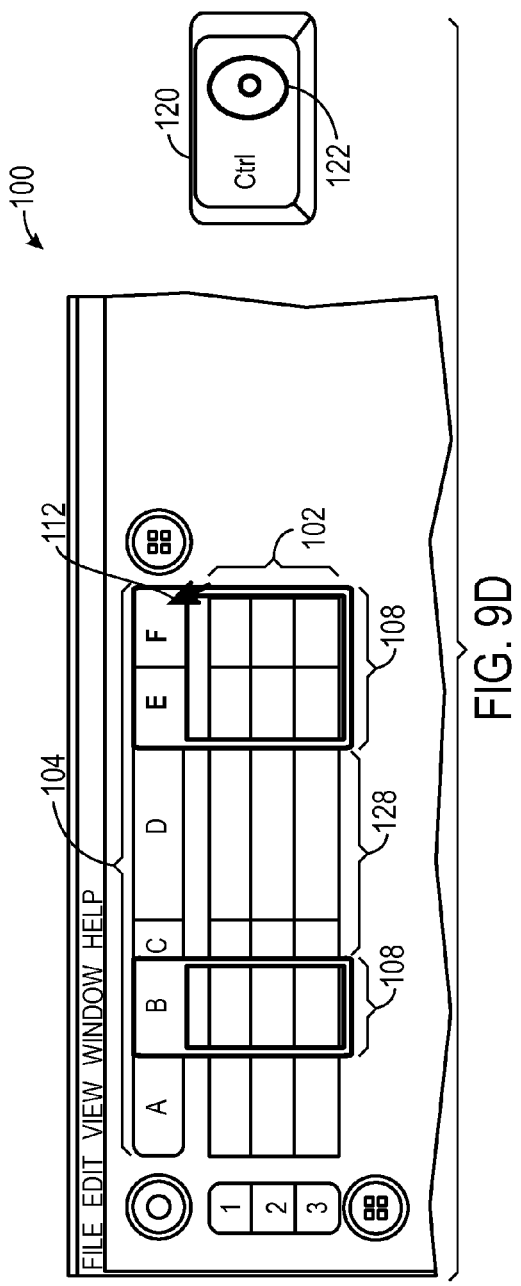
Figure 9E:
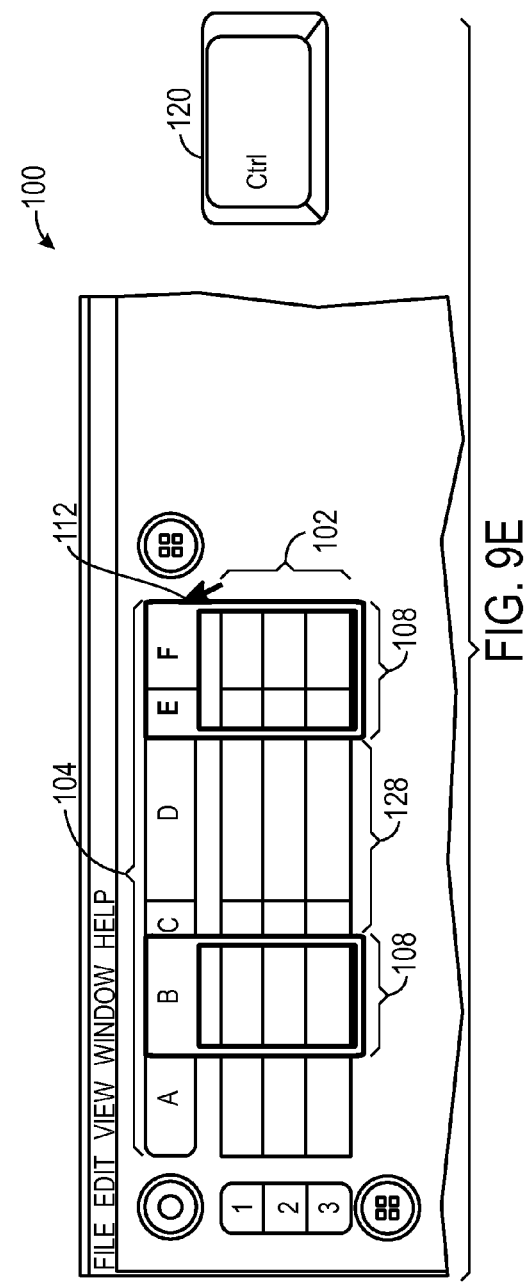

Turning to FIG. 9C, the user actuates or presses the designated modifier key 120, as indicated by touch or contact point 122. In response to activation of the modifier key, the display of table 100 on the electronic device 8 is altered to reflect the outcome of the selected columns 108 undergoing a uniform-type resize operation. As will be noted, the mouse pointer 112 remains positioned at the same point relative to the table 100, i.e., at the outside edge of column "F", during the switch between resize algorithms being visualized. In the present example, the intervening columns 128 do not participate in the uniform-type resize operation either, and thus remain unchanged in width.

As in the preceding example, because the mouse pointer 112 maintains its position relative to the table 100, and to selected columns 108 in particular, the user may continue resizing the selected columns 108 and visualizing the outcome without distraction or confusion. For example, turning to FIG. 9D, the user has moved the mouse pointer 112 inward, thus decreasing the size of the selected elements (i.e., decreasing the width of the selected columns 108) while still employing a uniform-type resize algorithm (as indicated by the continued contact 122 on modifier key 120). However, turning to FIG. 9E, if the user desires to once again view the outcome of the resize operation as it would be performed using a percentage-based approach, the user can release the modifier key 120 (as indicated by the absence of contact or touch point 122), causing the electronic device 8 to display the effect of using such a percentage-based algorithm. As noted above, the mouse pointer 112 (or user's finger in a touch-based implementation) remains in the same location (i.e., the outermost edge of column "F") relative to the table 100 and the selected columns 108 when the visualization is switched between algorithms.

The preceding examples depict scenarios in which the user has chosen to resize a set of table elements (i.e., elected columns 108) by interacting with an outermost (e.g., the rightmost) edge of the selected columns 108. However, in other implementations, it may also be desirable to allow a user to interact with an element (e.g., a row or column) that is located in the middle of the set of selected elements. Such a user interaction adds a degree of complexity to the visualization approaches discussed herein.

By way of example, and turning to FIGS. 10A-10E, an example is depicted in which a user has selected multiple elements (i.e., selected columns 108) of a table 100 for resizing. In the depicted example, the selected columns 108 are disjoint, with intervening, non-selected columns 128 separating some of the selected columns 108. Though a disjointed (i.e., non-contiguous) set of selected columns 108 is depicted by way of example in FIGS. 10A-10E, it should be appreciated that the present approach is equally applicable to a set of contiguous selected elements in which the user is performing a resize operation based on an interaction with an interior element of the selected elements.

Figure 10A:
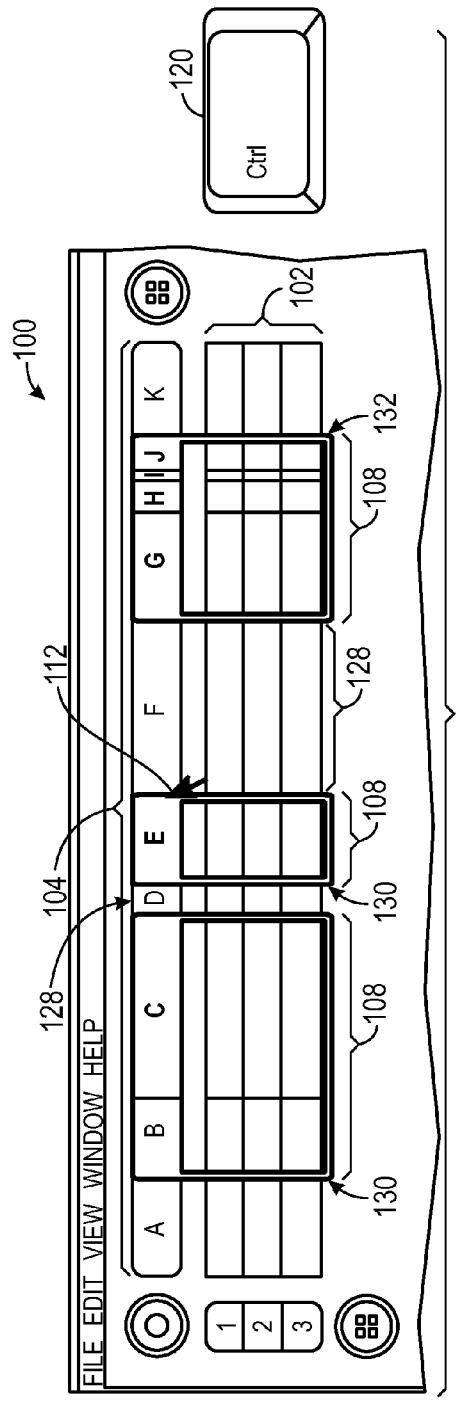
FIGS. 10A-10E depict a table in which a user toggles between viewing the outcome of a percentage-type resize and a uniform-type resize on a discontinuous set of selected columns where the user manipulates an interior element of the table, in accordance with aspects of the present disclosure.

Turning to FIG. 10A, a disjoint set of columns (selected columns 108) is depicted as being selected for a resize operation. The selected columns 108 are, at various points, separated by intervening columns 128 that are not selected to be resized. In the depicted example, the user has chosen to manipulate an edge of one selected column (column "E"), as indicated by the position of mouse pointer 112, that is positioned within the interior of the set of selected columns 108. That is, the column to be manipulated is not, sequentially, the first of last of the selected columns 108. As a result, there are columns that are selected for resizing on both sides (i.e., right and left) with respect to the column that the user is manipulating.

With this in mind, and to facilitate implementation of the visualization approaches discussed herein, the selected columns 108 may be split into two groups for separate processing: a first group 130 up to and including the element (e.g., column) to be manipulated for resizing (e.g., the columns to the left of the mouse pointer 112) and a second group 132 including those elements after the resizing element (e.g., the columns to the right of the mouse pointer 112). That is, the first group 130 is defined so that the mouse pointer 112 interacts with the outer edge (e.g., rightmost edge) of the columns of the first group 130, thus corresponding to the preceding examples.

Figure 10B:
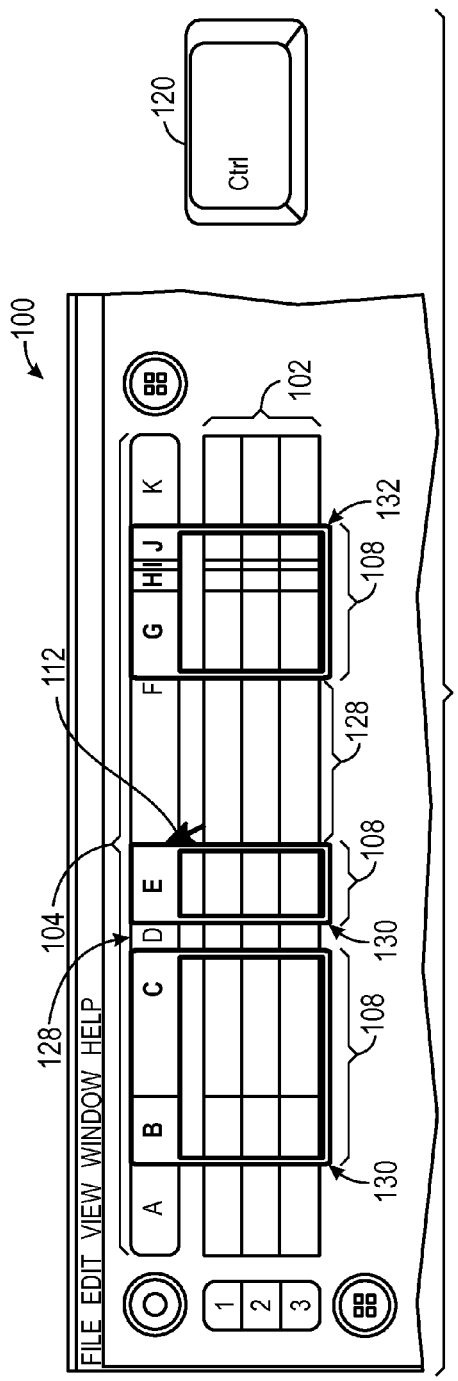

Turning to FIG. 10B, a percentage-type resize operation is depicted as being performed by the user on the selected columns 108. In particular, the depicted percentage-type resize operation is depicted as reducing the width of the selected columns 108 by some percentage or scaling factor corresponding to the motion of the mouse pointer 112 by the user. In one implementation, the percentage-type resize operation is separately performed on the first group 130 and the second group 132 of the selected columns 108. For example, a percentage-type resize operation may be performed on the first group 130 of selected columns 108 and, subsequently (or in parallel), a separate percentage-type resize operation may be performed on the second group 130 of selected columns 108. As will be appreciated, however, the relative motion of the mouse pointer 112 with respect to the first group 130 of elements (e.g., columns) provides the input to both percentage-type resize operations used to respectively resize both the first group 130 and the second group 132 of selected columns 108.

Figure 10C:
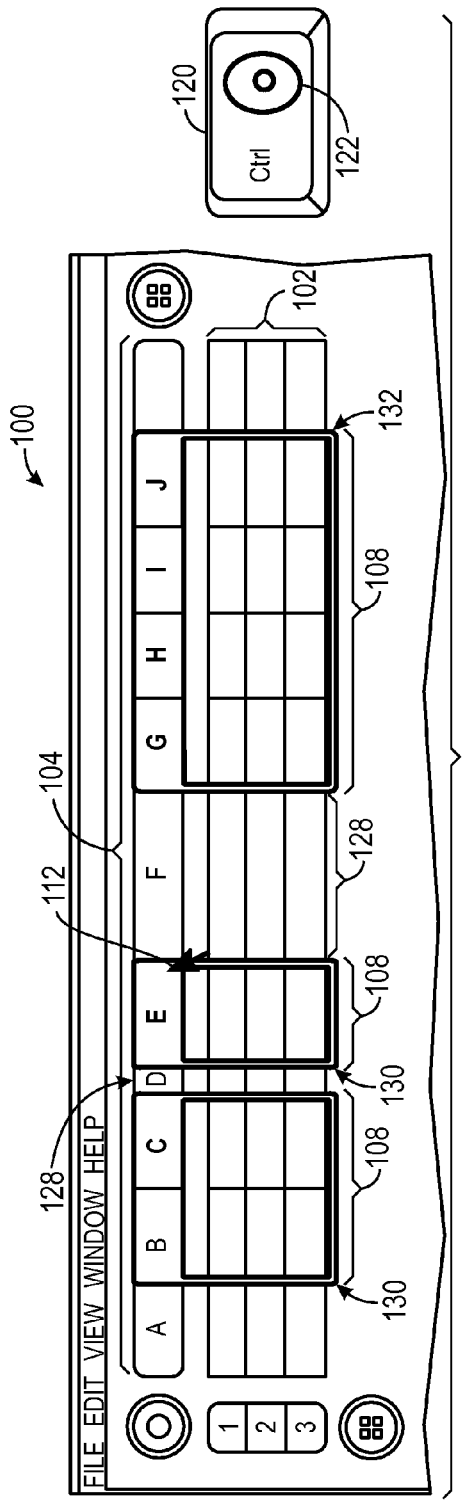
Figure 10D:
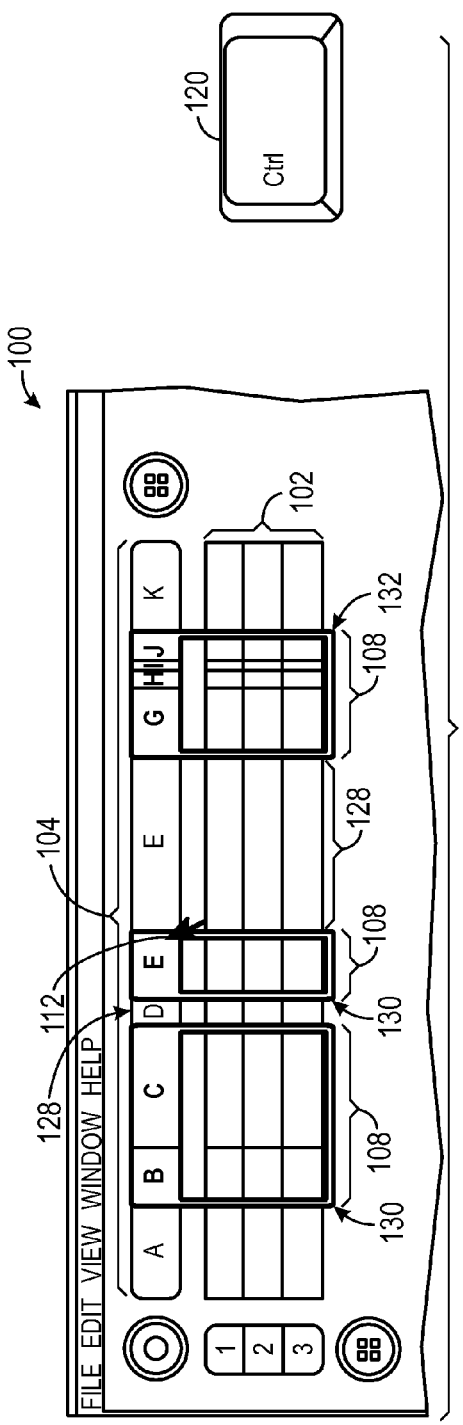
Figure 10E:
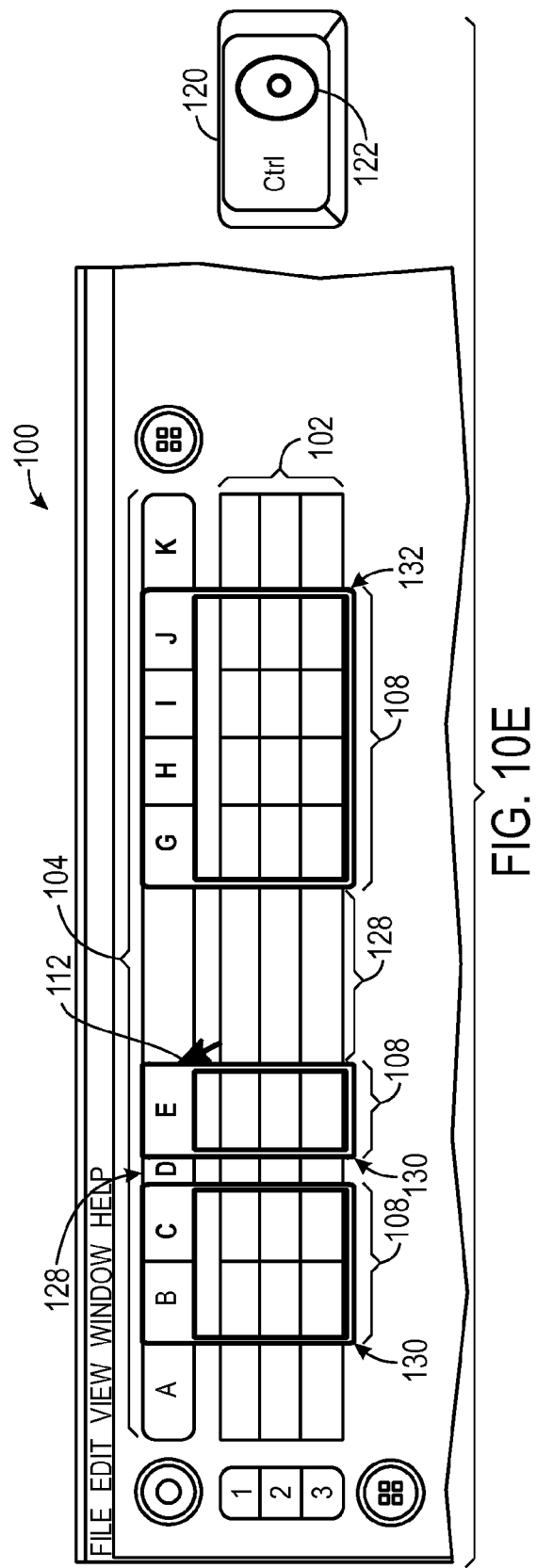

Turning to FIG. 10C, as in preceding examples, activation by the user of a modifier key 120 (denoted by touch or contact point 122) switches the visualization to correspond to a uniform-type resize operation. In one implementation, to perform the uniform-type resize operation, a unified resize algorithm is initially applied to the first group 130 of the selected elements (which includes the element being manipulated by the user). In particular, in this example the unified resize algorithm performs an averaging operation to calculate an average width based on the position of the mouse pointer 112, and each element (e.g., column) of the first group is set to the average width calculated by the algorithm. The calculated element size (e.g., column width) may then be applied to the second group 132 via a fixed resize operation, without any averaging operation performed on the elements of the second group 132).

In the depicted example, the columns of the first group 130 are uniformly resized based on an average column width determined by the position of the mouse pointer 112 (assuming no specified column minimum or maximum is reached) with respect to the columns of the first group 130. That is, moving the mouse pointer to the left would reduce the size (e.g., width) of the columns of the first group 130 whereas moving the mouse pointer to the right would increase the size of the columns of the first group 130. In this example, the average column width determined for the first group 130 (such as due to the movement of the mouse pointer 112 with respect to the columns of the first group 130) is then applied via a fixed resize operation to the columns of the second group 132.

As discussed above with respect to other examples, the user may toggle between the visualizations for the different resize algorithms by pressing or releasing the modifier key 120, as appropriate. For example, turning to FIG. 10D, the user has once again released the modifier key 120 (as indicated by the absence of a touch or contact point 122), causing the display to revert to a visualization of the selected columns 108 resized based upon a percentage-type resize operation. Conversely, turning to FIG. 10E, the user has once again pressed the modifier key 120 (as indicated by touch point 122), causing the selected columns 108 to be displayed in accordance with a uniform-type resize operation, as discussed above. As depicted in FIGS. 10A-10E, in accordance with this implementation, the mouse pointer 112 (or finger contact point in a touch-based implementation) remains at the same location with respect to the selected columns 108 (here the right edge of column "E") throughout the visualization and resize operations, thus reducing the likelihood of disorientation or confusion on the part of the user.

Figure 11:
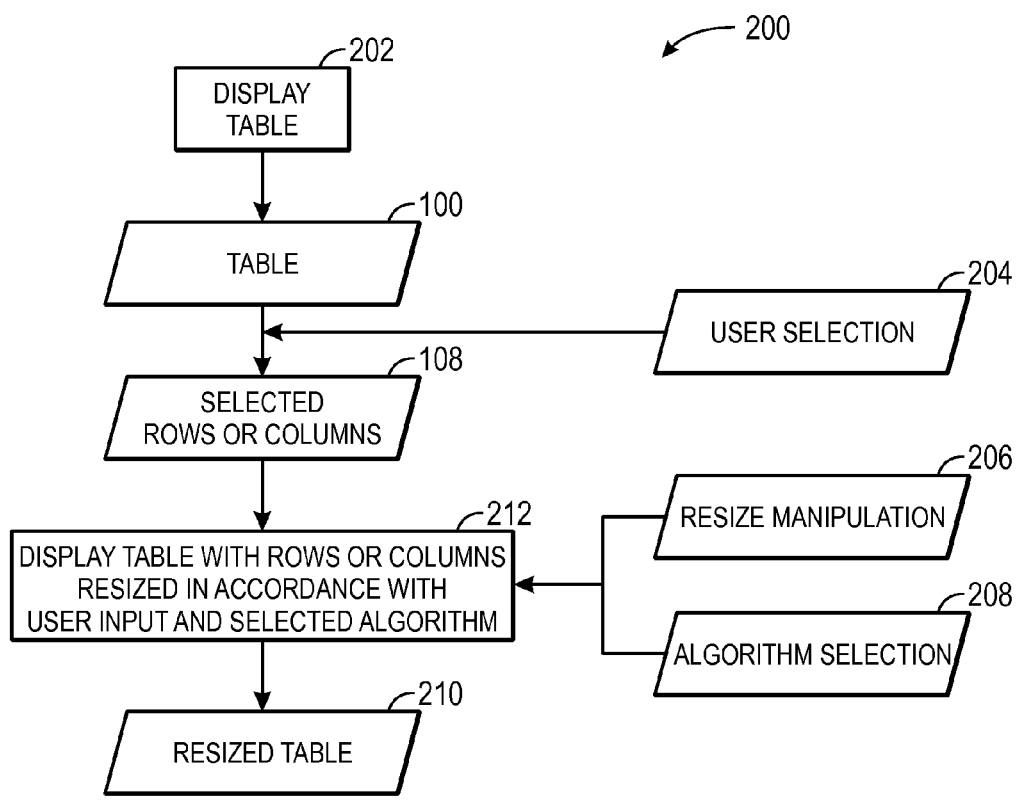
FIG. 11 depicts an example of control for implementing row or column resizing and visualization, in accordance with aspects of the present disclosure.

With the foregoing discussion and examples in mind, FIG. 11 depicts an example of control flow logic 200 that may be employed for implementing the table element resizing and visualization algorithms discussed herein. For example, the control logic described in FIG. 11 may be embodied as suitable computer code or other suitable stored routines which, when executed on an electronic device 8 (such as using a processor 16, memory 28, and display 10), allow the techniques discussed herein to be implemented on the electronic device 8.

Turning to FIG. 11, as discussed herein, a table 100 is initially displayed (block 202) on a display 10 of an electronic device 8. As discussed herein, the table 100 typically includes multiple columns 104 and rows 102. A user then provides a selection 204 of rows or columns to be resized in a resize operation, resulting in two or more selected rows or columns 108 being identified for the table 100. In the depicted example, the user next provides a resize input or manipulation 206, such as by dragging an edge of a selected column or row using a finger tip (in a touch-based implementation) or a mouse pointer. That is, the user provides an indication of whether the elements are to be reduced or increased in size as well as an indication of the extent to which the elements are to be changed in size, typically by dragging or manipulating an edge of a selected column or row.

In addition, in certain embodiments, the user also provides an indication 208 as to what type of resize algorithm is to be employed (e.g., a percentage-type resize algorithm, a uniform-based resize algorithm, and so forth). As discussed herein, such an indication may be provided by toggling a modifier key 120, allowing a user to toggle between different types of resize algorithms. As will be appreciated, other types of user input or feedback may also be employed to indicate selection of or toggling between resizing algorithms.

Thus, based upon the selected rows or columns 108, the resize manipulation 206 provided by the user, and the indication 208 as to which resize algorithm to employ, the electronic device 8 (such as via processor 16) acts to cause the display (block 212) of a resized table 210 with the selected rows or columns 108 resized in accordance with the user's inputs. As discussed herein, the user may continue changing the resize manipulation 206 as well as the algorithm selection 208 to see the effects of these changes on the resized table 210 prior to finalizing the resize operation.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

What is claimed is:

1. A method for resizing columns or rows of a table, comprising:
    displaying a table comprising multiple rows or columns of cells;
    receiving a selection input identifying two or more selected rows or columns;
    receiving a resizing input indicating at least an extent to which the selected rows or columns are to be resized;
    receiving an algorithm selection input indicating a type of resizing algorithm to be employed in resizing the selected rows or columns, wherein at least two resizing algorithms are available for selection by the algorithm selection input, and include a proportional-type resizing algorithm in which relative sizing between the selected columns or rows is generally maintained and another resizing algorithm available for selection by the algorithm selection input is a uniform-type resizing algorithm that takes an average value from varying column or row sizes to apply to all selected columns or rows to generate a uniform value; and
    displaying a resized table in which the selected rows or columns are resized based upon the extent indicated by the resizing input and the type of resizing algorithm indicated by the algorithm selection input.

2. The method of claim 1, wherein the resizing input comprises a user interaction dragging an edge of a selected row or column.

3. The method of claim 2, wherein, upon display of the resized table, the edge of the selected row or column maintains its position on a display.

4. The method of claim 1, wherein the algorithm selection input comprises a user actuation of a modifier key configured to be toggled between the application of different resizing algorithms such that the modifier key being in a first state corresponds to a selection of a proportional-type resizing algorithm and the modifier key being in a second state corresponds to selection of a uniform-type resizing algorithm.

5. The method of claim 1 comprising:
    receiving one or more additional resizing inputs or algorithm selection inputs and changing the display of the resized table to reflect the additional resizing inputs or algorithm selection inputs.

6. A non-transitory, computer-readable medium storing one or more instructions executable by a processor of an electronic device, the instructions, when executed, performing acts comprising:
    receiving a first input selecting two or more columns or two or more rows of a displayed table;
    receiving a second input corresponding to an instruction to narrow or widen the selected two or more columns or two or more rows and indicating an extent to which the two or more columns or two or more rows are to be narrowed or widened;
    receiving a third input indicating selection of a resize algorithm from among a plurality of resize algorithms available for selection, wherein the plurality of resize algorithms are employed when narrowing or widening the selected two or more columns or two or more rows, wherein the plurality of available resize algorithms comprises at least a proportional-type resizing algorithm in which relative sizing between the selected columns or rows is generally maintained and a uniform-type resizing algorithm that takes an average value from varying column or row sizes to apply to all selected columns or rows to generate a uniform value; and displaying a resized table comprising the selected two or more columns or two or more rows resized in accordance with the second input and the indicated resize algorithm.

7. The non-transitory, computer-readable medium of claim 6, wherein the instructions, when executed, perform acts further comprising:

receiving additional second inputs and updating the display of the resized table in response to the additional second inputs.

8. The non-transitory, computer-readable medium of claim 6, wherein the instructions, when executed, perform acts further comprising:

receiving an additional third input indicating an alternative resize algorithm being selected from the plurality of available resize algorithms and updating the display of the resized table based on the alternative resize algorithm.

9. The non-transitory, computer-readable medium of claim 8, wherein one of the resize algorithm or the alternative resize algorithm resize the selected two or more columns or two or more rows to be the same size.

10. The non-transitory, computer-readable medium of claim 8, wherein one of the resize algorithm or the alternative resize algorithm resize the selected two or more columns or two or more rows in a proportional manner so as to maintain the original size relationships between the selected two or more columns or two or more rows.

11. The non-transitory, computer-readable medium of claim 6, wherein the selected two or more columns or two or more rows are not contiguous.

12. The non-transitory, computer-readable medium of claim 6, wherein the instructions, when executed, perform acts further comprising:

maintaining an edge of a column or row that is manipulated to enter the second input relatively constant relative to an input medium such that the edge remains under the input medium in the resized table.

13. The non-transitory, computer-readable medium of claim 6, wherein the input medium comprises a mouse pointer or user finger.

14. A processor-based system, comprising:
a display;
a memory storing one or more routines; and
a processing component configured to execute the one or more routines stored in the memory, wherein the one or more routines, when executed by the processing component, cause acts to be performed comprising:
displaying a table on the display, wherein the table comprises a plurality of rows or columns;
receiving a selection of two or more rows or columns of the plurality of rows or columns;
receiving a manipulation of an edge of one of the selected two or more rows or columns, wherein the manipulation indicates an extent to which the selected two or more rows or columns are to be resized;
monitoring a modifier key to determine a state of the modifier key, wherein a first state of the modifier key corresponds to a first resizing algorithm corresponding to a proportional-type resizing algorithm and a second state of the modifier key corresponds to a second resizing algorithm corresponding to a uniform-type resizing algorithm, wherein the uniform-type resizing algorithm takes an average value from varying row or column sizes to apply to all selected rows or columns to generate a uniform value and wherein both algorithms are available for selection; and
displaying a resized table comprising the selected two or more rows or columns resized to the extent indicated by the manipulation of the edge and using the first resizing algorithm or the second resizing algorithm, as determined by the monitored state of the modifier key.

15. The processor-based system of claim 14, wherein the display comprises a touch screen.

16. The processor-based system of claim 14, wherein the selected rows or columns are not contiguous.

17. The processor-based system of claim 14, wherein the manipulation of the edge further indicates whether the selected two or more elements are to be narrowed or widened.

18. The processor-based system of claim 14, wherein the one or more routines, when executed by the processing component, cause further acts to be performed comprising:
altering the displayed resized table in response to one or more additional manipulations of the edge.

19. The processor-based system of claim 14, wherein the one or more routines, when executed by the processing component, cause further acts to be performed comprising:
altering the displayed resized table in response to a change in state of the modifier key.

* * * * *